(12) United States Patent
Schmidt et al.

(10) Patent No.: US 7,991,931 B2
(45) Date of Patent: Aug. 2, 2011

(54) DATA TRANSPORT ARCHITECTURE

(75) Inventors: Glen E. Schmidt, Bartlesville, OK (US);
Michel J. Baillargeon, Bartlesville, OK (US); Robert Farmer, Bartlesville, OK (US); Gregory J. Golden, Owasso, OK (US); Ray Shepherd, Tulsa, OK (US)

(73) Assignee: Siemens Industry, Inc., Alpharetta, GA (US)

( * ) Notice: Subject to any disclaimer, the term of this patent is extended or adjusted under 35 U.S.C. 154(b) by 522 days.

(21) Appl. No.: 11/743,209

(22) Filed: May 2, 2007

(65) Prior Publication Data
US 2008/0276019 A1 Nov. 6, 2008

(51) Int. Cl.
*G06F 13/00* (2006.01)
*H01C 7/12* (2006.01)
*G06F 13/42* (2006.01)

(52) U.S. Cl. .......... 710/100; 710/72; 710/104; 710/105; 710/106; 361/119

(58) Field of Classification Search .............. 10/72, 100, 10/105
See application file for complete search history.

(56) References Cited

U.S. PATENT DOCUMENTS

| 5,226,173 | A | 7/1993 | Sasaki et al. | |
|---|---|---|---|---|
| 5,819,052 | A | 10/1998 | Sonoda | |
| 6,614,634 | B1 * | 9/2003 | Westerfeld et al. | 361/62 |
| 6,961,624 | B2 * | 11/2005 | Kirkpatrick et al. | 700/19 |
| 7,127,638 | B1 * | 10/2006 | Sardella et al. | 714/15 |
| 7,293,470 | B2 * | 11/2007 | Mansfield | 73/861.356 |
| 7,348,803 | B2 * | 3/2008 | Bui et al. | 326/82 |
| 7,486,495 | B1 * | 2/2009 | Diederichs et al. | 361/119 |
| 7,870,324 | B2 * | 1/2011 | Schmidt et al. | 710/315 |
| 7,898,786 | B2 * | 3/2011 | Schmidt | 361/119 |
| 2004/0268138 | A1 * | 12/2004 | Larson et al. | 713/200 |
| 2007/0084282 | A1 * | 4/2007 | Hagg et al. | 73/290 R |
| 2008/0174178 | A1 * | 7/2008 | Jakobsson et al. | 307/31 |
| 2008/0180226 | A1 * | 7/2008 | Schmidt | 340/286.01 |
| 2008/0189456 | A1 * | 8/2008 | Schmidt et al. | 710/106 |

OTHER PUBLICATIONS

PCT Search Report for 2007P09095WO mailed on Jul. 30, 2008; 5 pages.*
Philips Semiconductors—"P82B96 Dual bi-directional bus buffer" Product specification; Mar. 6, 2001; 10 pages.*
CPAC—"NeSSI (New Sampling/Sensor Initiative" Generation II Specification; Jun. 14, 2004, 53 pages.*
"Connecting to an I2C Bus"—Nov. 2009, 9 pages.*
Siemens Applied Automation—"Let's Do It?" Using NeSSI; Feb. 2006, 18 pages.*
ExxonMobil—"NeSSI connectivity: progress on SAM and Smarts" by Jeff Gunnell; Feb. 22, 2006; 16 pages.*
"Designing Embedded Hardware" by John Catsoulis; Dated 2005, 3 pages.*

(Continued)

Primary Examiner — Brian T Misiura
(74) Attorney, Agent, or Firm — Filip A. Kowalewski

(57) ABSTRACT

The present invention is a novel device, system, and method for data transport and bus architecture. According to an exemplary embodiment of the present invention, the bus architecture may comprise of a continuous serial bus that may be incorporated into a process control sample system to provide an intrinsically safe and efficient system. An alternative exemplary embodiment, in an intrinsically safe control sampling system, a data transport device may be used to couple sampling controls and analyzers. An exemplary embodiment of the present invention may contain an access controller providing a protocol bridge for an intrinsically safe control sampling system to couple sampling controls and analyzers.

18 Claims, 16 Drawing Sheets

OTHER PUBLICATIONS

"New Sampling/Sensor Initiate (NeSSI) Update" IFPAC; Feb. 22, 2006, 1 page.*
"New Sampling/Sensor Initiative (NeSSI)" Timeline; Dated Apr. 14, 2010, 12 pages.*
"The I2C-Bus Specification Version 2.1"—Jan. 2000; 46 pages.*
National Instruments—"Filedbus—Foundation Fieldbus Overview"; May 2003, 67 pages.*
Arasan—"I2C Master/Slave Controller With APB Interface"—Dated 2005; 8 pages.*
Micro Computer Control Corporation—"Open-Collector/Open-Drain Circuit FAQ"; Retrieved Oct. 5, 2010, 1 page.*
IEEE P1451.6 Project—"Scope & Purpose", Dated Dec. 23, 2009; 1 page.*
"IEEE P1451.6 Home Page", downloaded from http://grouper.ieee.org/groups/1451/6/index.htm on Dec. 23, 2009.
"IEEE P1451.6 PAR Page", downloaded from http://grouper.ieee.org/groups/1451/6/PAR.htm on Dec. 23, 2009.
"IEEE P1451.6 Terms & Definitions Page", downloaded from http://grouper.ieee.org/groups/1451/6/TermsDefinitions.htm on Dec. 23, 2009.
"NeSSI (New Sampling/Sensor Initiative) Generation II Specification", Center of Process Analytical Chemistry, May 26, 2003.
"NeSSI (New Sampling/Sensor Initiative) Generation II Specification", Center of Process Analytical Chemistry, Jun. 21, 2004.
Dubois, Rob et al., "NeSSI—Generation II Revolution or Evolution?", ISA 2001, Houston Texas, Sep. 10, 2001.
"Industrial Automation using the CAN Bux Platform White Paper", Texas Instruments, May 2, 2003.
"Valve Communication Terminals" StoneL Corporation, downloaded from http://www.stonel.com/pdfs.vct_lit.pdf on Apr. 29, 2010.
"I.S. Isolators" pp. 3/50-3/51, downloaded from http://www.mega.ex.com/product_hazardous/Electrical%20Equipment/STAHL/03050051.pdf on Dec. 23, 2009.
"2001 IS Application Guide", PepperI+Fuchs, Inc., pp. 28-29, downloaded from http://www.am.pepperl-fuchs.com/pdf/documents/fieldbusapplication.pdf on Dec. 23, 2009.
"Fieldbus Repeater for IEC 1158.2", Pepperl + Fuchs Group, downloaded from http://www.moniteurdevices.com/PDF/FF/PowerIS.pdf on Dec. 23, 2009.
"Fieldbus Intrinisically Safe Barrier and Repeater SB312-LP Datasheet", Smar Research Corporation, downloaded from http://www.smar.com/pdf/catalogs/SB312-LPDSB.pdf on Dec. 23, 2009.
"The I2C-Bus Specification", Version 2.1, Phillips Semiconductors, Jan. 2000.
"Profibus Guideline", Version 1.1, Jun. 2003.
"CANopen Intrinsically Safe Capable Physical Layer Specification", CiA Draft Standard Proposal 103, Version 1.0, Mar. 23, 2007.

* cited by examiner

DATA TRANSPORT ARCHITECTURE

TECHNICAL FIELD

The present invention relates to a data transport architecture and more particularly, to a device, method, and system for data transport, bus, and bridge architecture for a control sampling system.

BACKGROUND INFORMATION

The invention relates to connecting sampling system components. An intrinsically safe, standardized electronic bus provides interconnection between analyzers and the mechanical components used for construction of sampling systems. The market requirement for this capability is developing and expected to grow rapidly. There is a growing customer awareness that one of the major causes of cost in the ownership of analyzer systems is the maintenance and operation of the sample conditioning system. Customers incur cost in this area in various ways:

the number of man-hours required for maintenance;
the level of training and experience required by the personnel involved;
the off-line time of the analyzer system while maintenance is underway.

Customers may be strongly motivated to reduce cost of ownership and recognize that this can be done by improving sampling system design and using modern electronic controls to facilitate "smart" systems. However, the mechanical and electronic components required for this purpose may be cumbersome and expensive and the kind of improvements desired could not be built cost effectively or with the level of reliability needed. Recent advancements in mechanical component design, brought about as part of an industry standardization effort, have solved some of the mechanical part of this problem.

The invention is directed at solving the electronic part of the problem. Extractive types of process analyzers, may require sample conditioning systems. The purpose of the SCS is to remove a quantity of process fluid from the process,
transport it to the analyzer,
alter its pressure and temperature as necessary to be compatible with the analyzer,
clean, filter and change the state of the sample as necessary to ensure that it can be analyzed,
inject the sample into the analyzer, and
ensure that the resulting sample is representative of the original process.

To perform these functions, many mechanical components may be used, for example, regulators, flow controllers valves, gauges, filters, heaters, temperature controllers, liquid-drop out assemblies, vaporizers, and more. In general, these mechanical components may be discrete devices. They are manufactured by a variety of companies. They may be interconnected with hand-cut and hand-shaped tubing and tubing connectors. While components from different manufacturers may perform functions that are similar to each other, they are usually not interchangeable. Complete SCS packages are often large, requiring significant wall or floor space in crowded process plant environments. The entire assembly may be subject to significant maintenance issues including blocking, clogging and outright failure. Failure of the systems may not be observed until the reading from the analyzer itself is affected. Additionally, failure of the SCS can lead to damage in the analyzer.

Many alternatives to SCS design have been considered in the past. Some analyzer types (such as the LDS manufactured by SIEMENS®) make their measurement directly inside a process vessel which eliminates the need for an SCS entirely. Other types of sample conditioning involve "remote sampling" and "discrete" or "packet sampling" methods. The goal of these designs is to minimize the amount of process fluid that must be handled and therefore to minimize the maintenance requirements of an SCS. However, many analyzer technologies cannot operate without first extracting a sample from process. Therefore, various attempts have been made to resolve problems in more direct ways.

One technique is to create "smart" sampling systems. Such systems would be designed with parallel or alternative flow paths and back up systems and use automated controls to monitor operation and switch sample paths. In principle, a system could be built that offered 100% on-line time. However, all such designs have been impractical for most uses. This is because of the cost and size of the mechanical components involved and the lack of a simple and easy-to-use electronic interconnection system and controller.

Accordingly, a need exists for a device, method, and system for improving communication and compatibility between components of an SCS. There may be an additional need to reduce maintenance and training and experience required by the personnel involved.

SUMMARY

The present invention is a novel device, system, and method for data transport and communication bus architecture. According to an exemplary embodiment of the present invention, the bus architecture may comprise a continuous serial bus that may be incorporated into a process control sample system to provide an intrinsically safe and efficient system. The serial bus may use a continuous active low and passive high communication signal. Isolating links or couplers between groups or segments of devices may not be necessary in this bus architecture. This type of communication signal also may allow for an intrinsically safe, single end power source to be used. While the bus may be capable of having more than one intrinsically safe power source, there may be no longer a need for relatively small segments of devices to each have its own power supply. As a result of the power management in the bus architecture, the number of allowable nodes in the system may be increased over that of prior art. For each node, an access controller may be used as an interface. According to an exemplary embodiment for use in a process control sampling system, each individual device such as a valve, sensor, flow control, or digital I/O may interface with an access controller which communicates with the serial bus. The bus may be used to couple sampling controls (e.g. flow or pressure controls) and analyzers (e.g. temperature sensors).

An alternative exemplary embodiment, in an intrinsically safe control sampling system, a data transport device may be used to couple sampling controls and analyzers. In an exemplary embodiment of the present invention, a data transport device may be comprised of a module for transmitting and receiving signals on a continuous serial bus having an active low and passive high and intrinsically safe communication signal. The data transport device may provide automatic configuration of a converter associated with a node of the control sampling system. The data transport device may also be comprised of a converter for translating signals to and from an end device of the control sampling system into the data transport protocol. An exemplary embodiment of the module may transmit and receive signals using an Inter-Integrated Circuit protocol. The module may further comprise a separate input/output memory map for the converter. A clocking and data lines of the module may use a time controlled slew rate implementation. In an exemplary embodiment, the module may supply power to the converter and to the components of the node. The data transport device provides an un-terminating structure with the converter. An exemplary embodiment may rely on the module to transmit and receive signals from an analyzer interfaced with a control sampling system.

An exemplary embodiment of the present invention may contain an access controller providing a link from an intrinsically safe control sampling system to couple sampling controls and analyzers. The access controller may comprise a advanced interface for communicating an Inter-Integrated Circuit protocol. The access controller may comprise a serial peripheral interface (SPI) for communicating in a protocol with one or more nodes of the control sampling system. The serial peripheral interface may provide automatic configuration of a device associated with the node. An exemplary embodiment of the protocol bridge may incorporate a advanced interface that communicates with an active low and passive high signal. The advanced interface of the protocol bridge may supply power to the device associated with the node. The advanced interface may have an input/output memory map specific for the access controller. In an exemplary embodiment, the clocking lines and data lines may use a time controlled slew rate implementation. In another embodiment, the access controller may allow the advanced interface to reach a voltage differential of equal or greater than about nine volts.

It is important to note that the present invention is not intended to be limited to a system or method which must satisfy one or more of any stated objects or features of the invention. It is also important to note that the present invention is not limited to the exemplary embodiments described herein. Modifications and substitutions by one of ordinary skill in the art are considered to be within the scope of the present invention, which is not to be limited except by the following claims.

BRIEF DESCRIPTION OF THE DRAWINGS

These and other features and advantages of the present invention will be better understood by reading the following detailed description, taken together with the drawings herein.

DETAILED DESCRIPTION

Figure 1:
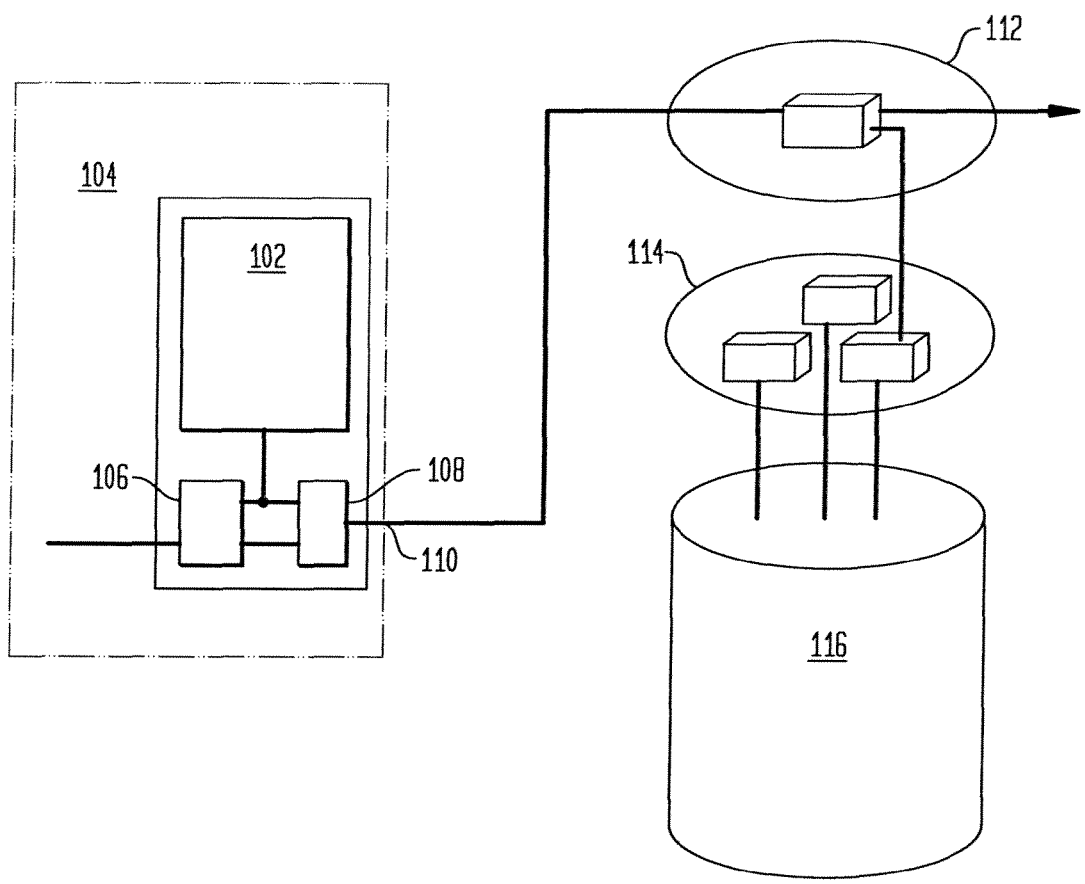
FIG. 1 is a block diagram of an exemplary embodiment of the invention of a process control sampling system 100.

Referring to FIG. 1, a possible configuration is shown utilizing an exemplary embodiment of the invention in a portion of a process control sampling system 100. The portion shown from the process control sampling system 100 contains an electronics enclosure 104 which may have an intrinsically safe (IS) power supply 102, an Inter-Integrated Circuit (I2C) buffer 106, and an intrinsically safe (IS) barrier 108. The intrinsically safe (IS) power supply 102 is a power supply device that meets or exceeds the requirements for an IS rating to be used in a hazardous environment. A hazardous environment may contain flammable gasses or vapors, combustible dusts, or ignitable fibers. In an exemplary embodiment of the invention, the intrinsically safe (IS) power supply 102 may supply a voltage differential of equal or greater than about nine volts. The Inter-Integrated Circuit (I2C) buffer 106 presents the ability to allow for analog voltage drops of equal or greater than about one volt across an undetermined length of cable. This permits the drive levels of the bus to be dependent on the total current draw of the sample control system. This may lend to better communication performance over longer cable lengths and higher common mode tolerance. An exemplary embodiment of the invention may use a "Phillips buffer P82B96" as the buffer 106. The use of other buffers implementations are possible and within the scope of the invention. The intrinsically safe (IS) barrier 108 allows for wiring without additional protection such as conduits running from the electronics enclosure 104 to be rated for use in a hazardous area. The communication signal enters and leaves the electronics enclosure 104 through an robust, industrialized, and shielded interface 110. An additional Inter-Integrated Circuit (I2C) buffer 106 is used to translate the industrialized signals into a format that the access controller 112 can support. An access controller 112 provides an interface between the Inter-Integrated Circuit (I2C) protocol of the electronics enclosure 110 and the protocol of a sampling system component or peripheral 116. An exemplary embodiment of a practical configuration of the serial bus is located upstream from the electronics enclosure 104.

The access controller 112 may be integrated into the component electronics by the manufacturer of each component 116. A component electronics interface 114 is represented in this portion of the process control sampling system 100. The component electronics interface 114 is located on each component or peripheral 116. The interface 114 electronically integrates the access controller 112 into the component electronics. This integration provides the component 116 with a "plug and play" capability. For example, once the component 116 is physically connected to the system, the component 116 may be immediately available for its intended use. This system 100 is an example configuration and the invention is not limited to this configuration. In most process control sampling systems or other applications, the component 116 may be the first component of a serial string of many sampling components. It may be beneficial for each component to have the "plug and play" capability in order to greatly simplify the set-up and maintenance of the system, as well as, to significantly increase the flexibility of the system. Other configurations of a system are possible and within the scope of the invention.

Figure 2:
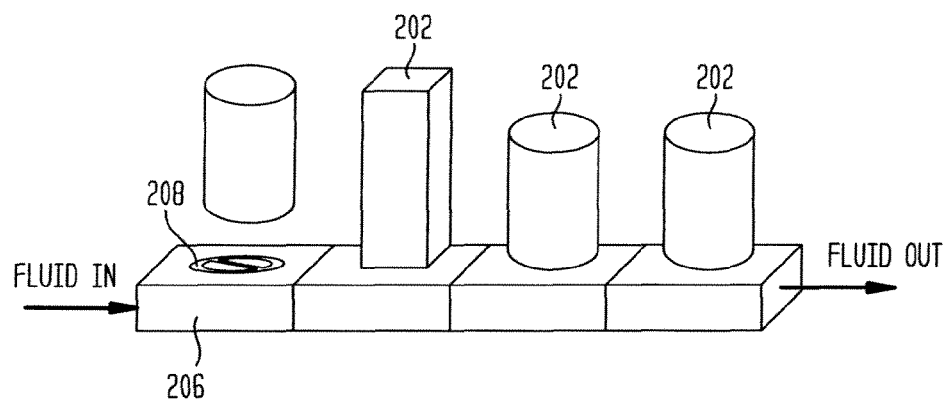
FIG. 2 is a block diagram of the physical component portion of a process control sampling system used in the prior art.

Referring to FIG. 2, an example of the physical component portion of a process control sampling system used in the prior art is shown. In a series of initiatives to cooperatively implement improvements in an analyzer system, a mechanical standard, SP76, was developed by the ISA Standards and Practices committee. The mechanical standard defines a fixed "footprint" that can be adapted for use by most of the sensors and components used in a sampling conditioning system (SCS). A peripheral or component 202 of the system may be a gauge, regulator, flow controller, automatic or manual valve, sensor, etc. The component 202 is coupled into a standard "substrate" 206 using a mounting pattern 208 determined by the mechanical standard, SP76. The layout of this component portion of a process control sampling system provides for further variations in process control sampling systems.

Figure 3:
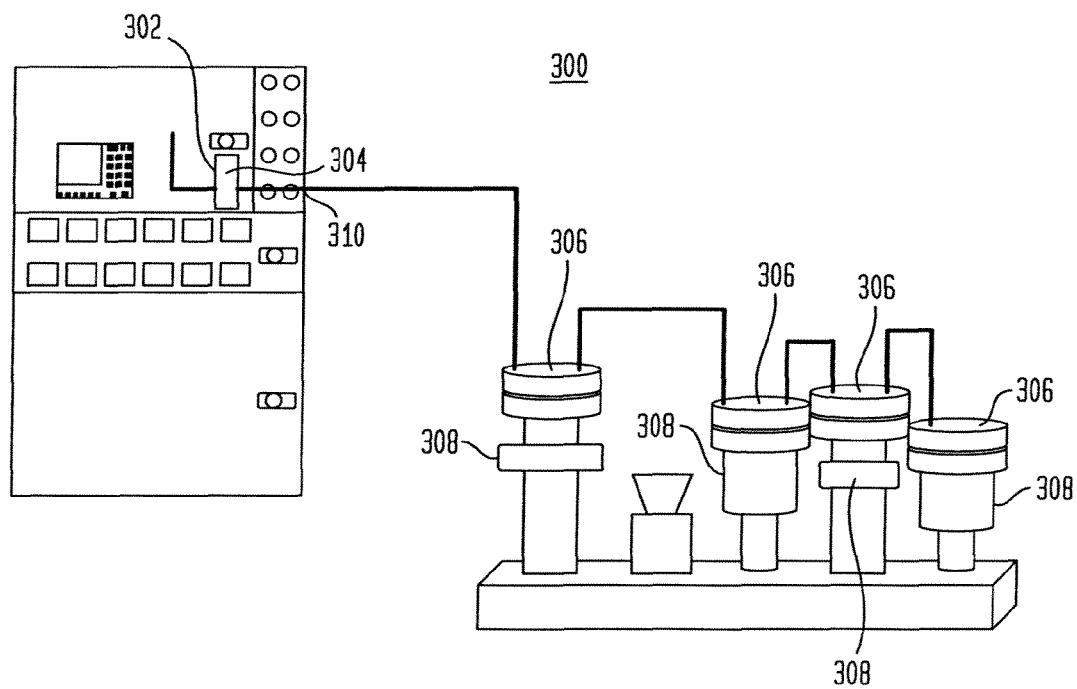
FIG. 3 is a block diagram utilizing another exemplary embodiment of the invention in a more complete process control sampling system 300.

Referring to FIG. 3, a possible configuration is shown utilizing another exemplary embodiment of the invention in a more complete process control sampling system 300. An exemplary embodiment of a continuous serial bus 302 may be used to transmit the communication signal to and from an electronics enclosure 304. The electronics enclosure 304 may comprise an intrinsically safe (IS) power supply, an Inter-Integrated Circuit (I2C) buffer, and an intrinsically safe (IS) barrier. The electronic enclosure 304 may be similar to the previously mentioned electronics enclosure 104 from FIG. 1. The communication signal enters and leaves the electronics enclosure 304 through an Inter-Integrated Circuit (I2C) interface 310. In this exemplary process control sampling system 300, there are many components or peripherals 308. Each component may be serially connected through an access controller 306. Each component 308 is electrically integrated with an access controller 306.

This integration concept allows the access controller 306 to handle all of the Inter-Integrated Circuit (I2C) bus communications thereby allow for the elimination of any need for the component manufacturer to connect to the bus itself. The microcontroller device may be, for example, a "PIC" chip manufactured by MICROCHIP® of Chandler, Ariz. or other suitable device. The microcontroller device may be used in an exemplary embodiment of the access controller. The microcontroller device may be loaded with the operating information relating to an exemplary embodiment of the access controller, and interface their component electronics to the standard ports on the microcontroller device.

Figure 4:
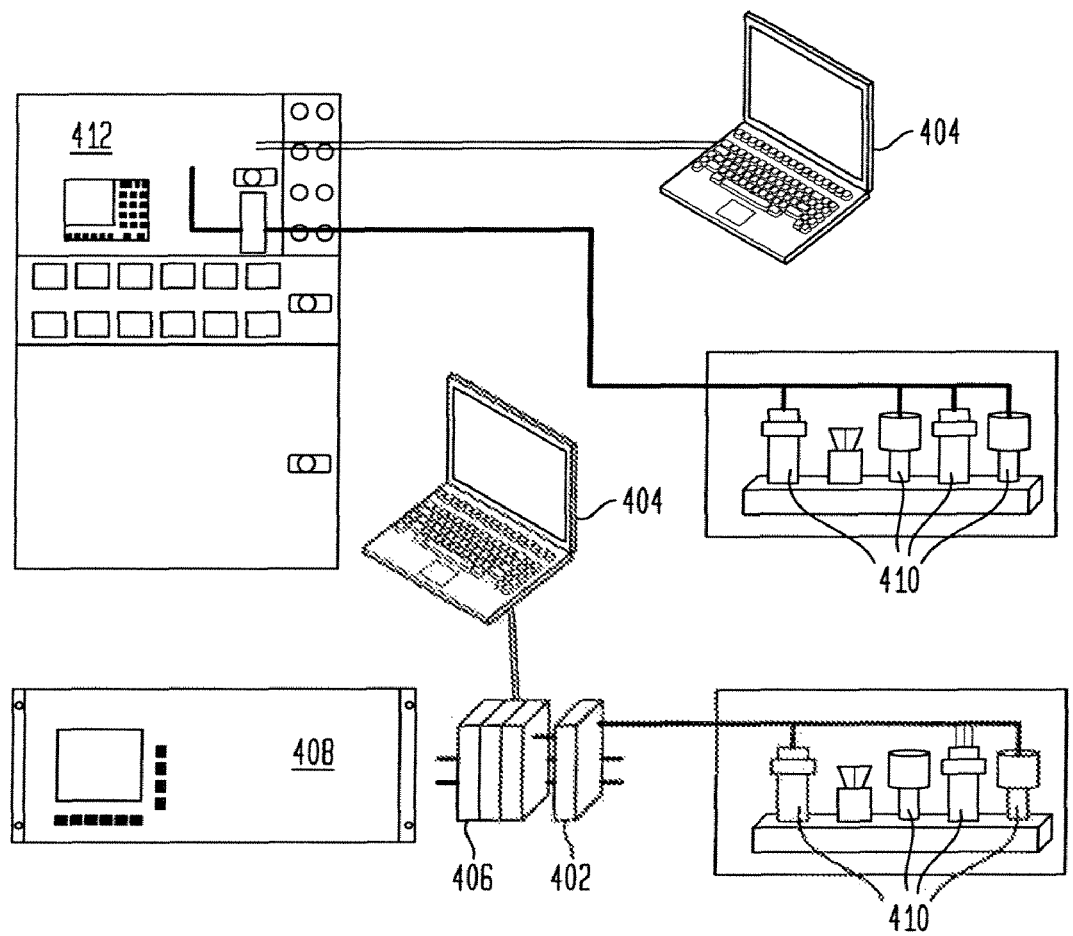
FIG. 4 is a block diagram of an exemplary embodiment of two complete options for a process control sampling system.
Figure 5A:
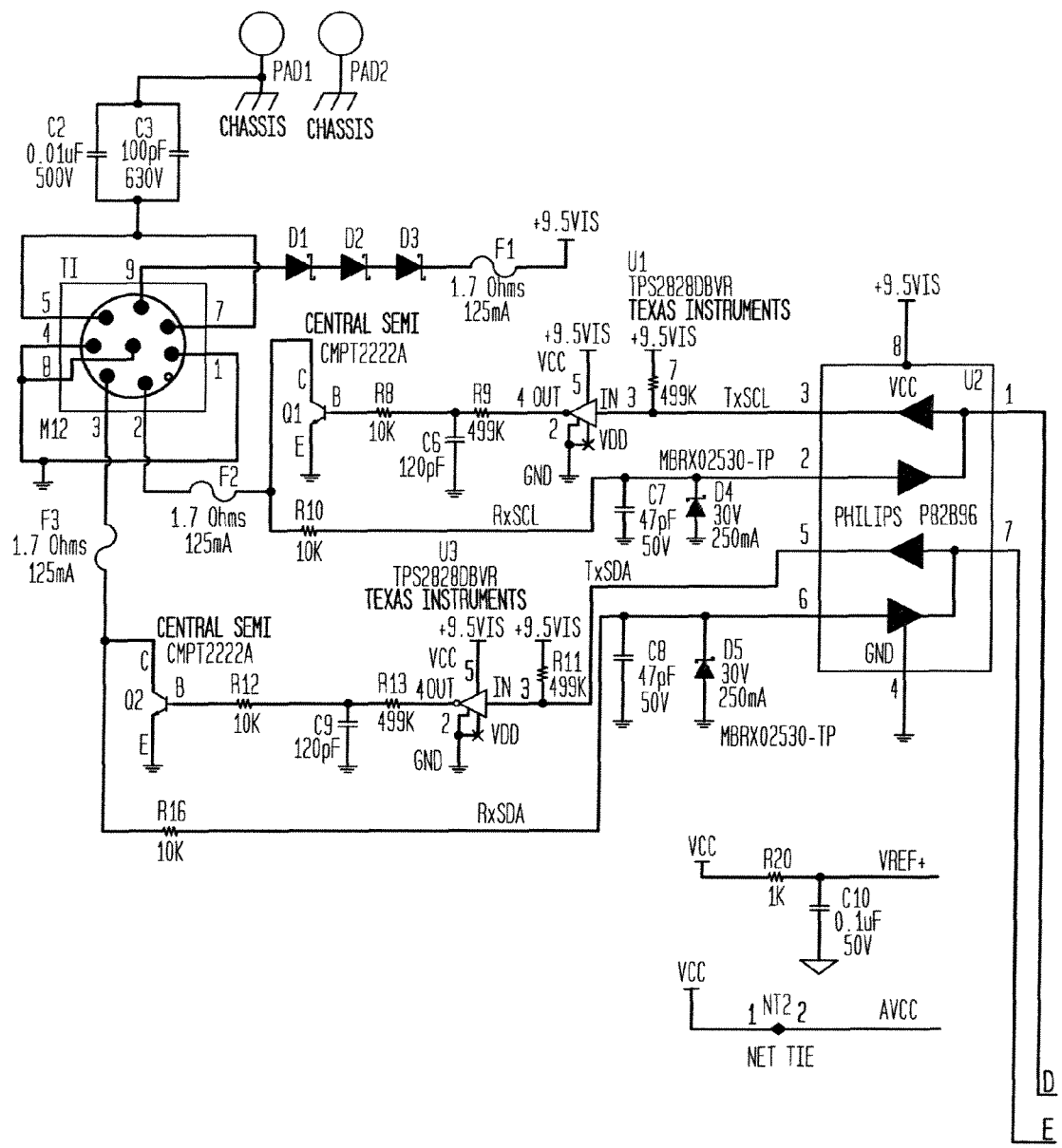
FIGS. 5A-5E are block diagrams of an exemplary embodiment of an electrical schematic according to the present invention.
Figure 5B:
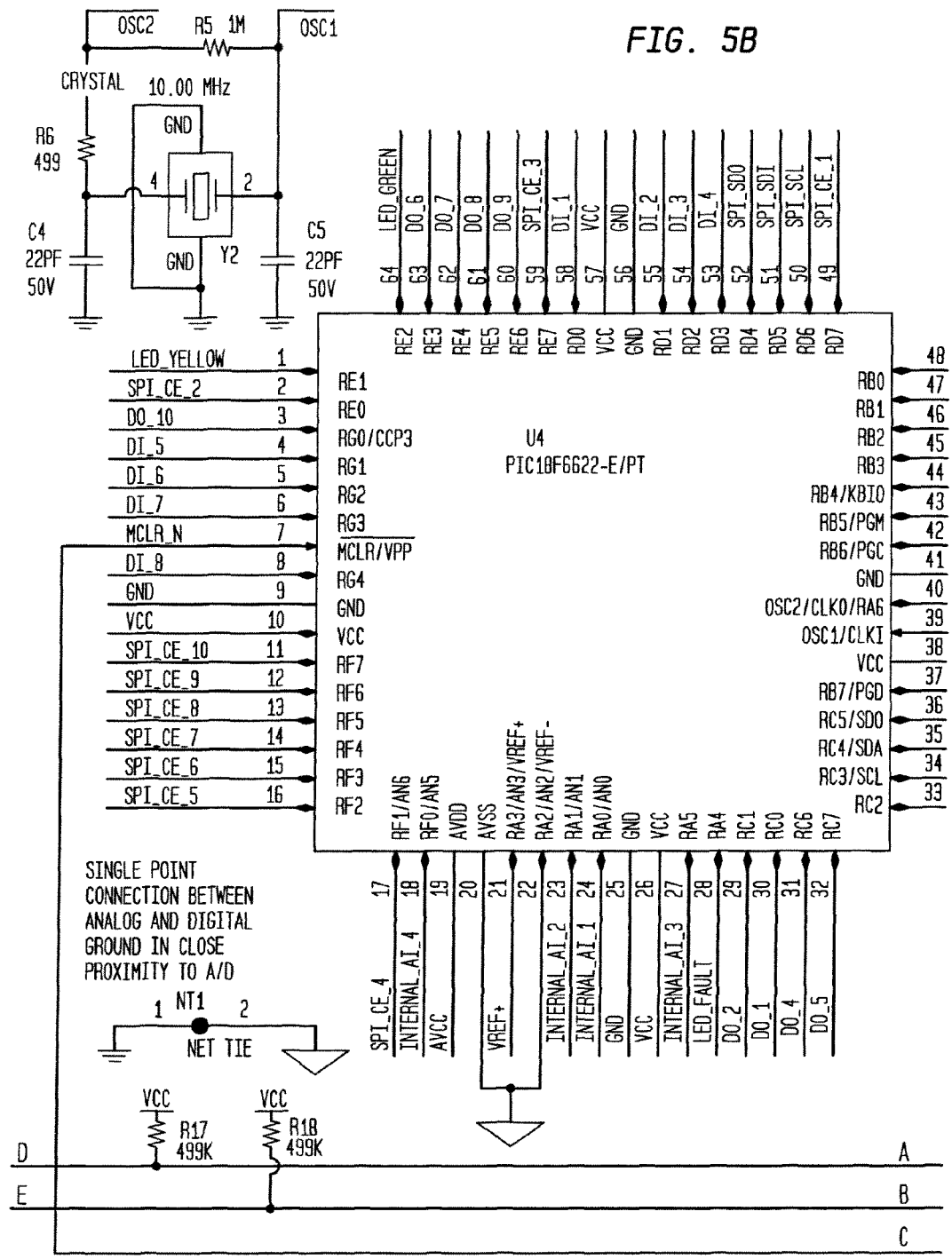
Figure 5C:
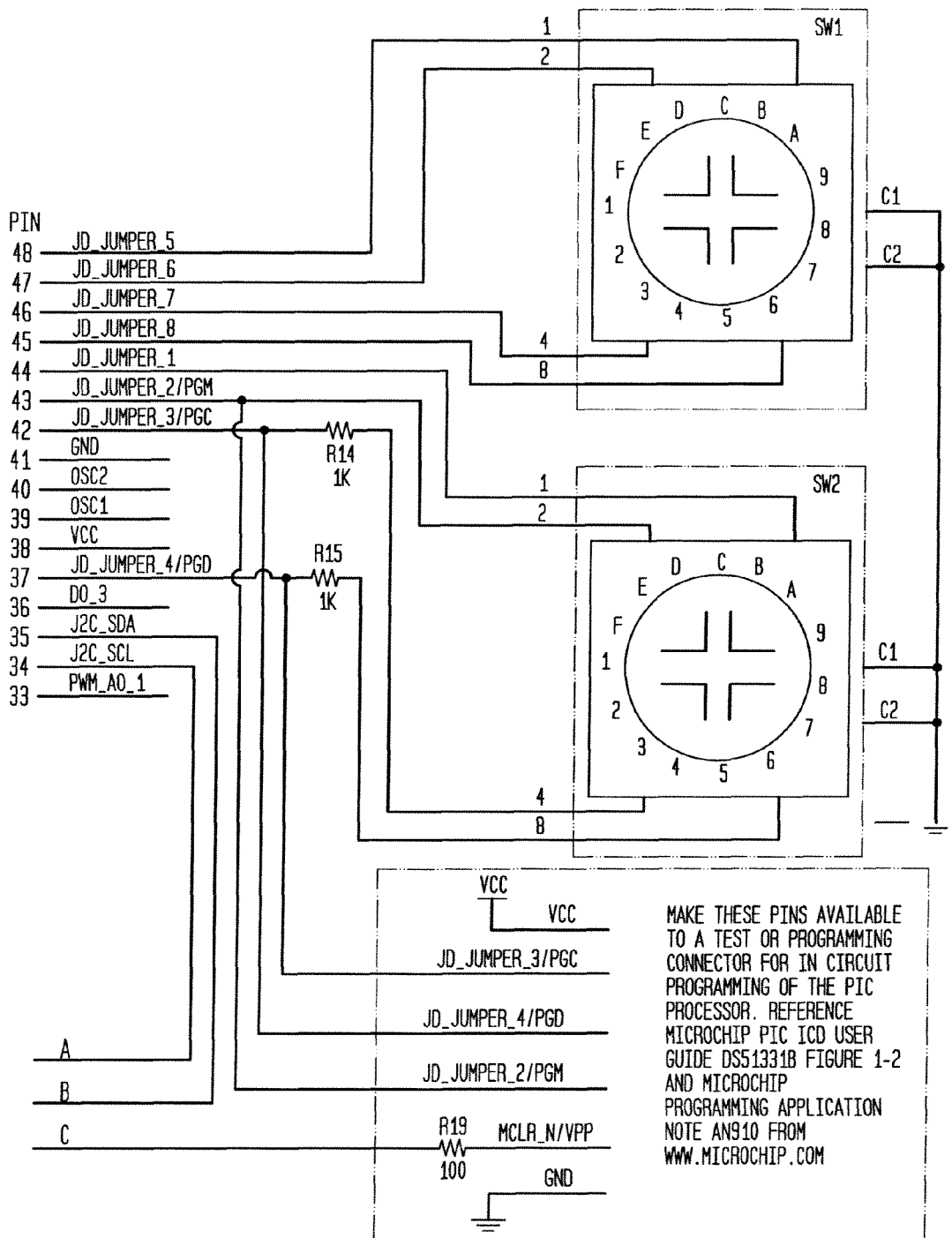
Figure 5D:
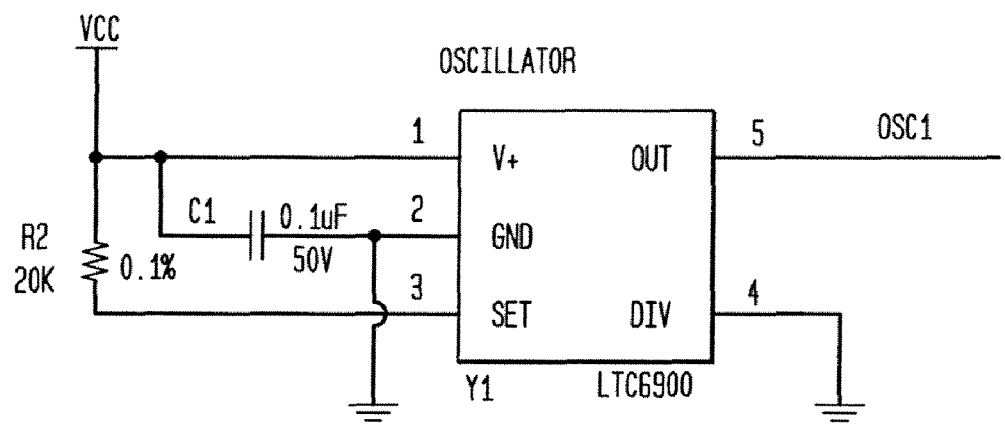
Figure 5E:
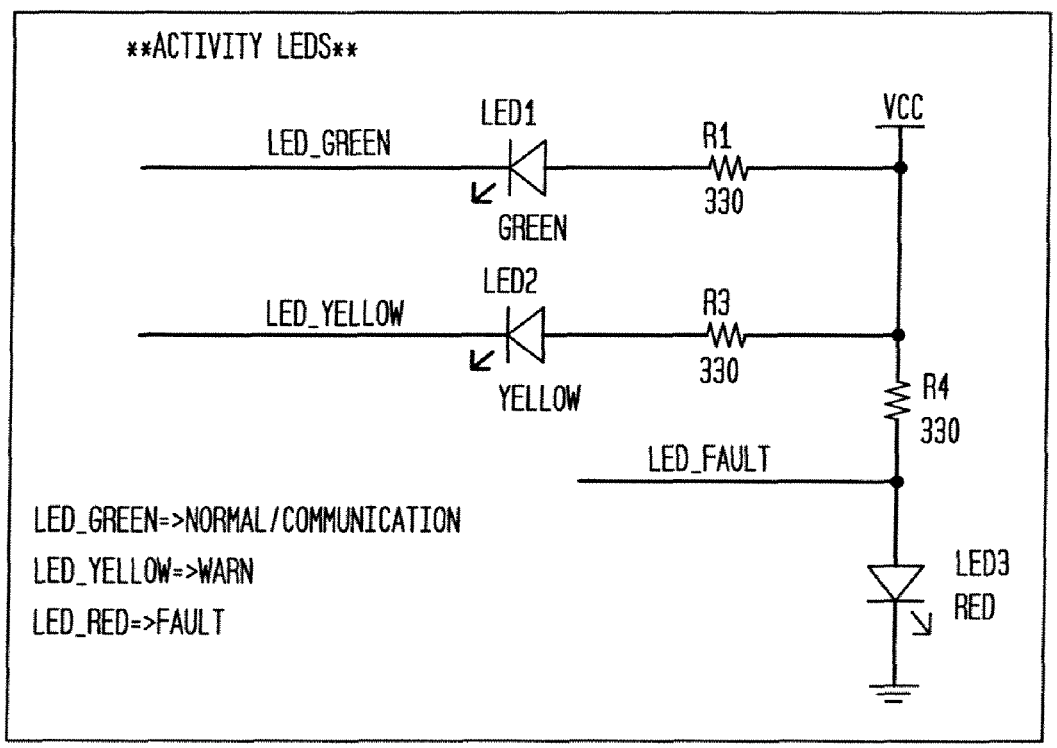

Referring to FIG. 4, two complete options for a process control sampling system are provided. In one exemplary application of the invention, a smart analyzer 412 is used to control and/or monitor the sampling system. In another exemplary application of the invention, for example, gas analyzer 408 is used along with a connectivity device, for example, a programmable logic controller (PLC) 406 and a protocol bridge 402 to control and/or monitor the sampling system. A few examples of system parameters to be controlled may be stream selection (selecting a fluid to sample), temperature regulation, and pressure regulation. Outputs to be monitored may include failure detections, blockages, or other error conditions. In both systems, a computer monitor interface 404 can be used as a visualization tool for all components or peripherals 410 serially connected through a connectivity device. The connectivity device may be a Modbus-Link from RELIABLE® Controls of Victoria, BC Canada or a similar device that would provide connectivity between Modbus connections and an Ethernet connection. The protocol bridge 402 may be another exemplary embodiment of the invention. This embodiment may bridge from standard Modbus protocol to an Inter-Integrated Circuit (I2C) protocol. An exemplary application of the exemplary embodiment may involve mounting the protocol bridge 402 to a DIN-rail module to enable its use with a programmable logic controller (PLC).

Referring to FIGS. 5A-5E, an electrical schematic 500 of an exemplary embodiment of an element of a process control sampling system (112 on FIG. 1) is shown. This is one exemplary schematic of the invention although the invention is not limited to this configuration. Other configurations of a system are possible and remain within the scope of the invention.

Figure 6:
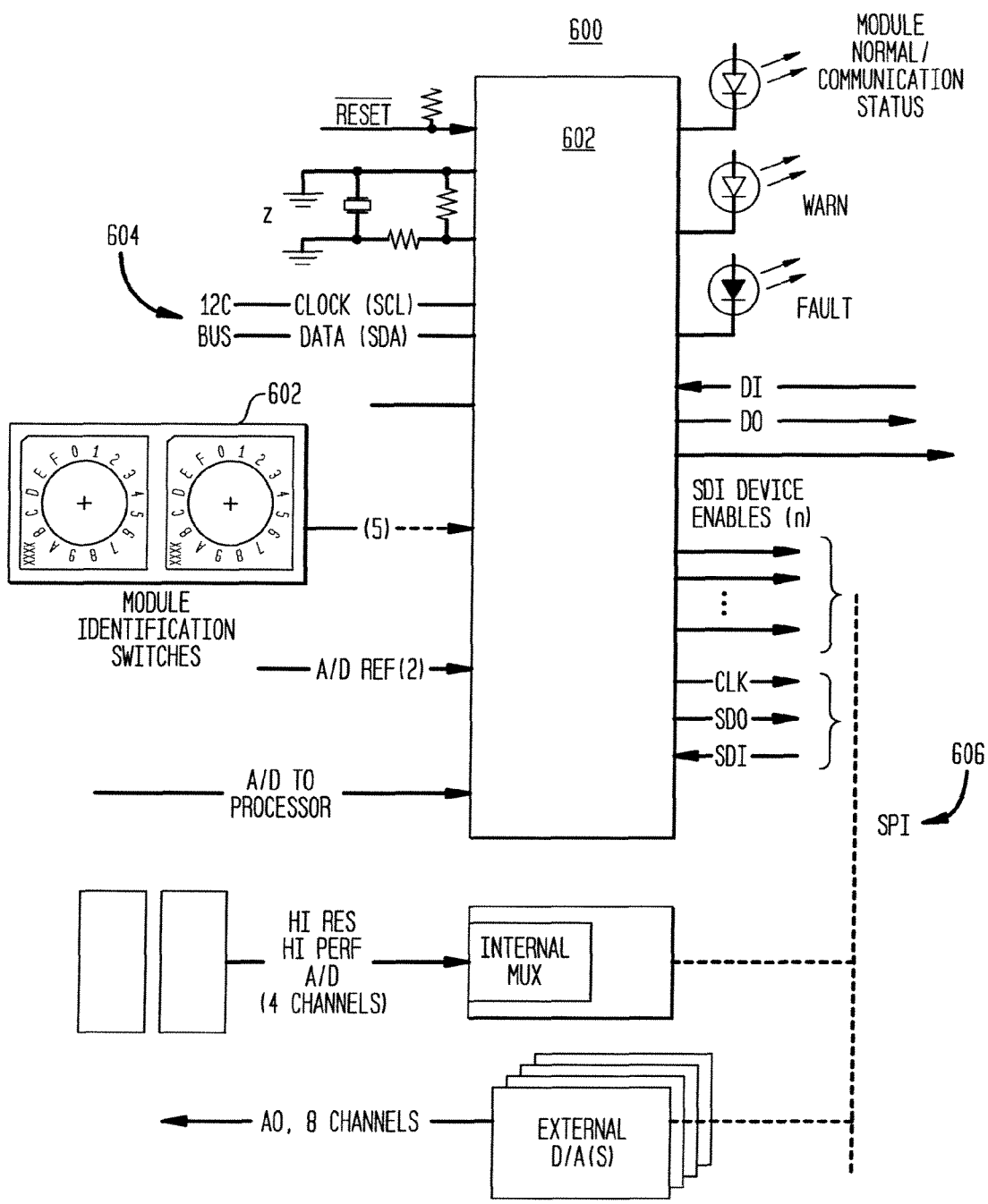
FIG. 6 is a block diagram of an exemplary embodiment of process control sampling system 600 which utilizes an access controller 602 according to the present invention.

Referring to FIG. 6, this is an exemplary embodiment of process control sampling system 600 which utilizes an access controller 602. The access controller 602 may be used as an Inter-Integrated Circuit (I2C) slave device on a serial bus such as the Maxum Datalink bus by Siemens Energy & Automation. The microcontroller device may function as a universal Input/Output Controller (IOC) for process instrument peripherals. The usage of this IO may be pre-defined and configurable by EEPROM settings. This IO may be "internal" IO (i.e. peripherals that exist on the microcontroller device) or pre-determined external devices that interface to the microcontroller device interface pins. Combinations of external and internal I/O may be supported as well. The SPI bus may connect to another independent processor which has its own set of Analog Inputs (AI's), Analog Outputs (AO's), Digital Inputs (DI's), and Digital Outputs (DO's) as an extension of the access controller 602. In this configuration, the access controller 602 may interface between the SPI and the Inter-Integrated Circuit (I2C) interface in a manner which is pre-defined and configurable by internal EEPROM settings. An exemplary embodiment of the access controller 602 may create a clean separation between the predefined and static (unchanging) software requirements for the access controller 602 and what are likely to be dynamic or product and supplier specific requirements that may be implemented in a function other than in the access controller. Any or all of the combinations of functionality represented in FIG. 6 may be supported provided there does not exist a conflict between usage of the same physical component pins or resources.

An exemplary embodiment of the access controller 602 may be a universally applicable/configurable device that may be used as a standard interface device for "NeSSI" sample system components. (NeSSI stands for "New Sampling System Initiative".) A component manufacturer may acquire the microcontroller device used in an exemplary embodiment of the access controller 602, program it with the operating information relating to an exemplary embodiment of the access controller 602, and interface their proprietary component electronics to the standard ports on the microcontroller device. The access controller 602 may also be used in applications such as chromatography.

Figure 7:
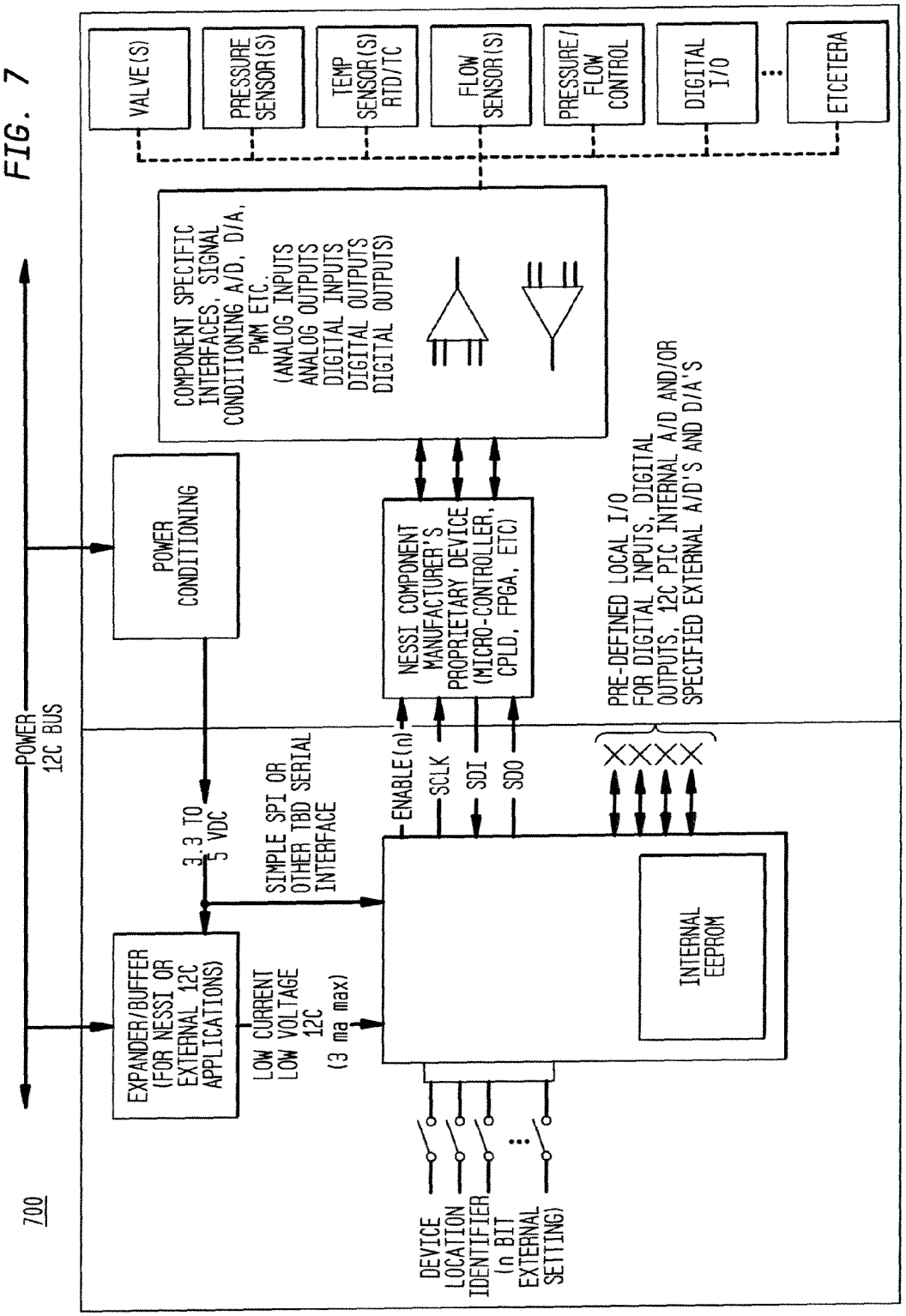
FIG. 7 is a block diagram of a more complex exemplary embodiment of process control sampling system 700 according to the present invention.
Figure 8:
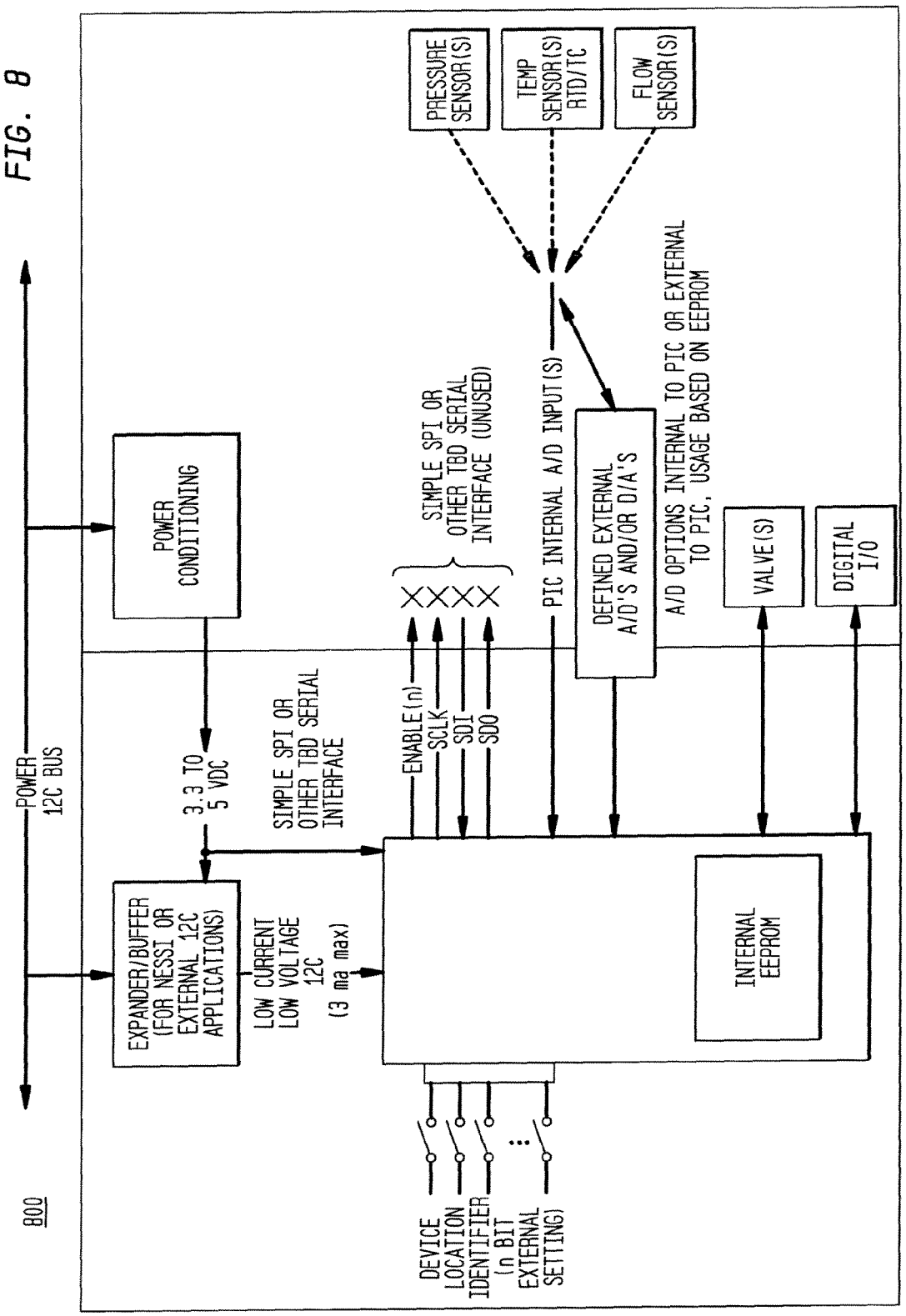
FIG. 8 is a block diagram of a less complex exemplary embodiment of a process control sampling system 800 according to the present invention.
Figure 9:
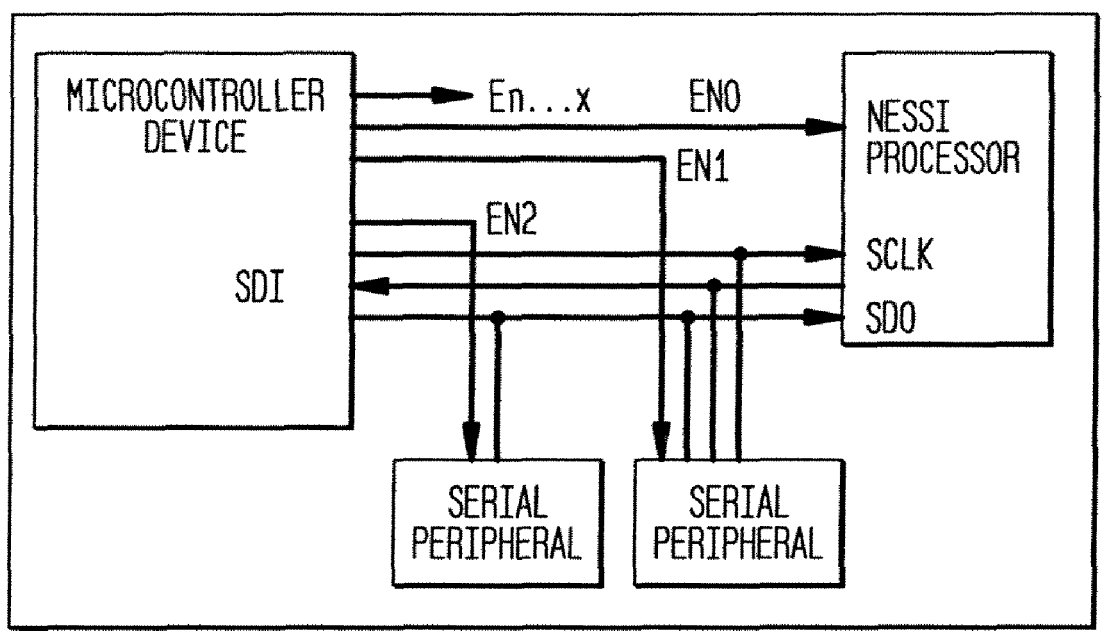
FIG. 9 is a block diagram of an exemplary embodiment of a Serial Peripheral Interface architecture with Multiple Peripherals and enables according to the present invention.

Referring to FIG. 7, an exemplary embodiment of more complex process control sampling system 700 is provided. In another exemplary embodiment a less complex process control sampling system 800 is shown in FIG. 8. Components and communication protocols of both process control sampling systems 700 and 800 are described herein.

A MAC_IOC may be compatible with the Maxum I2C Datalink bus. Unlike the Maxum I2C bus, the NeSSI I2C bus may not have a dedicated reset line between the bus manager and the slave devices. In the Maxum, the I2C bus reset line is connected to the MCLR (Master CLeaR) pin of the slave microcontroller device and may be used by the bus manager to force a hardware reset of the connected devices.

As shown in FIG. 6, every MAC-IOC device in a system may be required to use Module Location identification switches (or an equivalent hardware function). This may be required to uniquely distinguish between two or more identical modules in the same system. In the exemplary NeSSI system, it may also be preferable to make these identifications unique on a system wide basis for ease of identification of all modules.

As shown in the figures above, the MAC-IOC may have an internal EEPROM. This may be programmed at the manufacture of the module. The EEPROM contains the configuration of the MAC-IOC, such that the behavior of the MAC-IOC is defined. The EEPROM configuration may enable what I/O of FIG. 8 is used, the configuration, scaling, etc as applicable. In the same manner, the type of data passed on the SPI interface may also be configured. The module device type, serial number and other standard information will also be contained in the EEPROM.

The internal I2C capabilities of the SPI peripherals inside the microcontroller device may be utilized for the MAC-IOC interface to the Maxum Chromatograph or associated hardware. The MAC-IOC may operate with direct I2C connections to the Maxum Datalink or with a Philips P82B96 I2C buffer as shown in FIG. 7.

The basis for Intrinsic Safety (I.S.) is to limit energy in the system below a level such that explosive gases cannot be ignited in the event that some or all of the available energy is delivered to create a spark. A second key tenant of I.S. is that energy cannot be stored in such a manner that it can be released into a spark that has greater energy that what the system was limited to in the first place. Any capacitance, inductance, or combination thereof must be limited in value, or it's respective voltage or current limited such that an explosion causing spark can never happen. The standards for I.S. (UL 913, IEC 600079-11, for example) say that there must be provision for two "countable" faults to occur and the system still is safe.

The standards have well characterized tables and curves of allowable capacitance vs. a maximum system voltage and the allowable inductance for a maximum current. There are also curves for purely resistive systems. In this case, it is truly a max voltage vs. max current curve. The higher the voltage or current means the less allowable respective capacitance or inductance. To complicate things further, the standards may not make allowances for combinations of resistance, inductance and capacitance. At that point, you "fall off the curves". Therefore, it may be difficult to design a complex system and simply fit it into the curves without a test of the combination. Such tests are quite expensive, and usually require several iterations. Another alternative is to use a power supply and/or I.S. barrier that has been certified already, for use with specific voltages, currents, and maximum capacitance and inductance. For the NeSSI system, the power supply, manufactured by Pepperl+Fuchs is a 9.5V 1A power supply that is already tested, proven and certified to be intrinsically safe when the system it is used in has no more than a total of 800 nF of capacitance and no more than 10 uH of inductance or any combination thereof. In this manner, it may not be important how much capacitance or inductance is in the associated circuit, so long as the total of each does not exceed the totals allowed for the power supply.

A simple way to look at an I.S. circuit or system is to consider all wring that enters or leaves the system as a potential energy source, and to look at all capacitances and inductances, and treat them as potential energy sources. The combined the total energy must be accounted for, and ensured to be below an acceptable (often tested) level for prevention of an ignition condition when explosive gases are present.

When implementing a digital serial bus, if the bus driver(s) sources current, then the bus itself is a potential energy source. For example, the CAN bus is a multidrop "OR'd" bus like I2C, however, it uses differential drivers. Hence, high and low states on the bus require one or more device to drive energy into the bus. The exemplary bus implementation here may be designed not to add energy to the system. It may be designed so that it only can remove energy from the system.

Figure 10A:
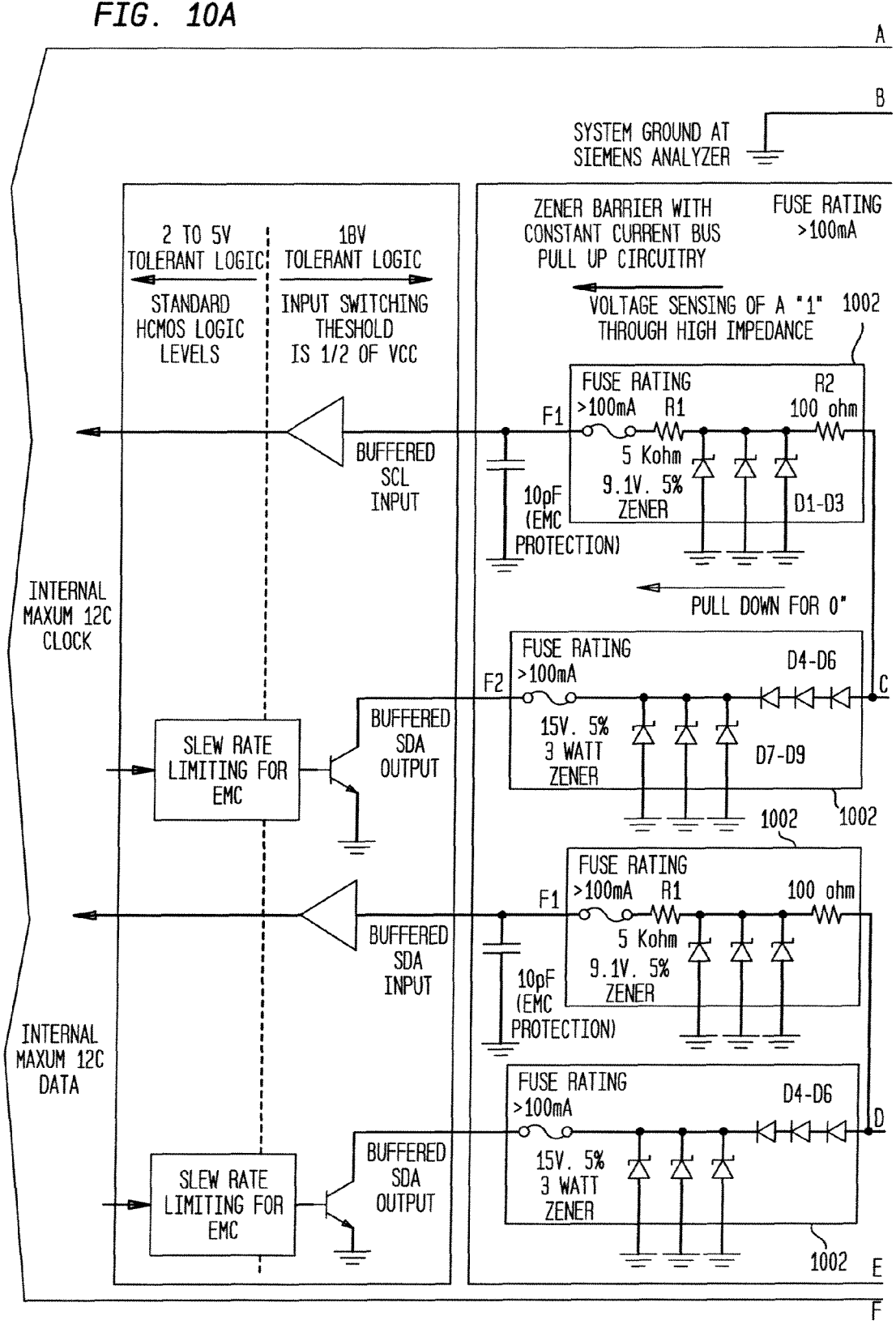
FIGS. 10A and 10B are block diagrams of an exemplary embodiment of a Serial Peripheral Interface architecture variation of I2C with Multiple Peripherals and enables two separate unidirectional components according to the present invention.
Figure 10B:
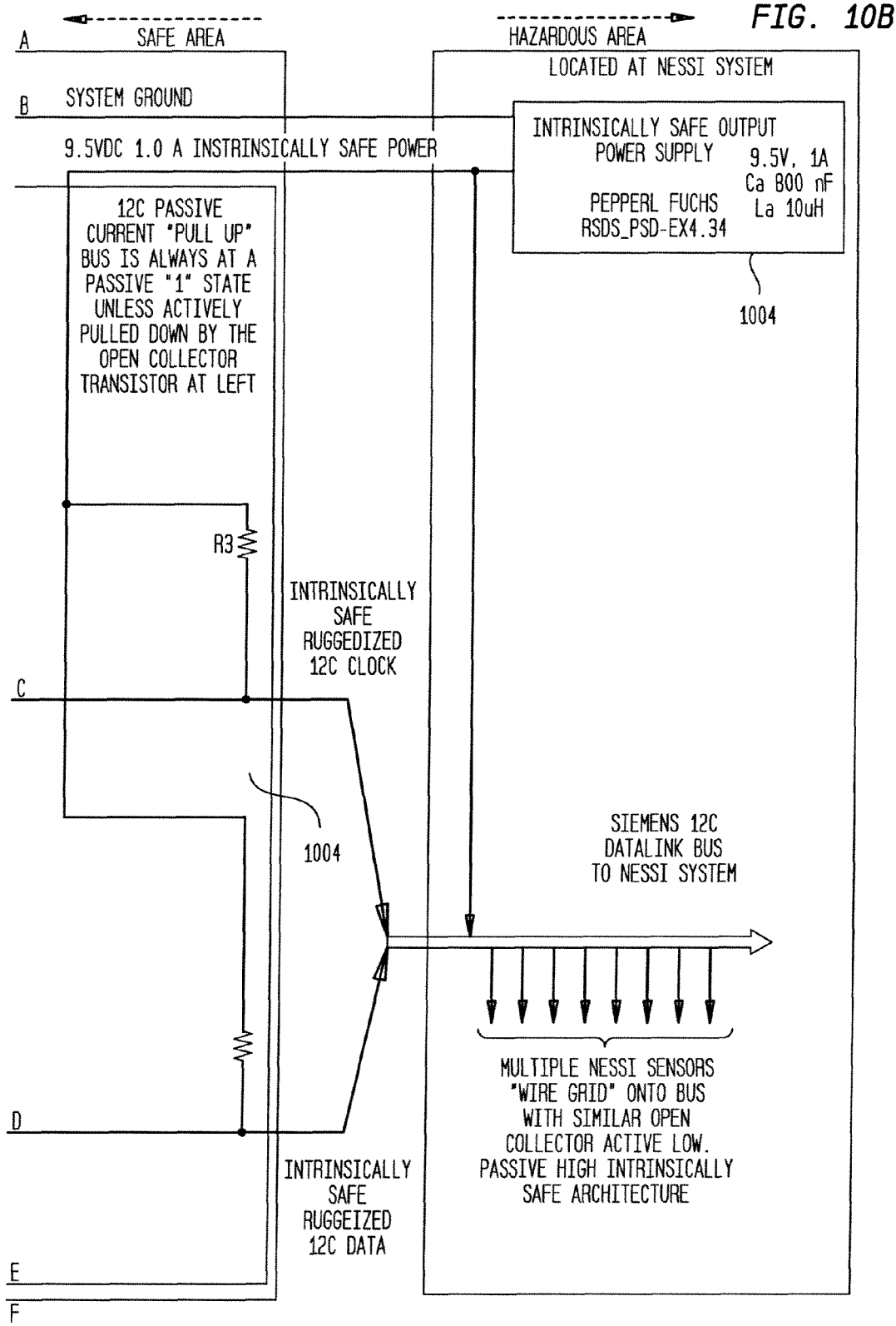

Referring to the FIGS. 10A and 10B, the previously described Pepperl+Fuchs I.S. power supply (or similar device) can deliver power into the system as long as it's entity parameters are not exceeded and provide that there is no other contribution of energy into the system by any other wiring or circuits. The resistor R3 "pulls up" the bus to a passive high or digital "1" state. When there is no communication on the bus, this is how the bus remains. When a device "speaks" on the bus, that device drives the bus low to present a digital "0" on the bus. A serial data stream is constructed from the series of passive "1's" and active "0's". Since all devices only sink current and never source current, there may never be a physically damaging contention between electrical devices.

I2C is a two wire protocol, comprising a data and clock signal. The data signal is bi-directional, and in some systems, the clock is also bi-directional. This means that a device may transmit a low received by another device at one time, and at another point in time, another device may transmit a low on the bus for the original device to receive. Each wire may be completely bi-directional in nature. This is native to the I2C protocol. For the purpose of buffering or strengthening a signal, it is possible to utilize a buffer device or to construct an I2C interface device that is four wires. In this case, two of the wires are for transmitting a low or "0" value from a device on clock and data lines and two more clock and data lines are reserved only for receiving the level of the bus. In this manner, the signals can be transmitted as four wires, or the wires can be re-combined into two sets of wires over long distances. This architecture is shown in FIGS. 10A and 10B.

Since each signal is broken into two separate unidirectional components, this architecture variation of I2C can be adapted very well to an I.S. implementation. Referring back to FIGS. 10A and 10B, four barriers 1002, two for the clock and two for the data, and all part of a larger total barrier device 1004. The application to the clock is identical to the application for the data. Therefore, the upper set of circuitry is identical to the lower set of circuitry. From this point on, only the upper set (clock) will be referred to and the same is applicable to the data.

When a device wishes to communicate on the bus, the "buffered SCL output" transistor turns on, forcing the bus low. This draws current out of the I.S. circuit, thus removing energy from the I.S. system. This is without dispute, a safer mode, as the total energy is less on the I.S. side.

Having described that an active low open collector or open drain transistor drives the bus without adding energy, it is also important to demonstrate where the device can "listen" to activity on the bus. From the I.S. perspective, this is more challenging than transmitting a low that "sinks" current, in that to sense a high and a low, in one case or the other, some amount of current must flow into the I.S. side from the non-I.S. side. This is done in a manner that may be unimportant to the total energy level allowed in the I.S. circuit. Since voltage levels can be sensed with a very high impedance, a high impedance resistance (R1) is used as an infallible barrier device. The "Buffered SCL Input" has a very high input impedance. The performance of this input may not be affected by the additional resistance of R1. It can be seen, therefore, that R1 only allows a negligible amount of energy into the I.S. area. Furthermore, the selection of D1-D3 is such that these diodes limit voltage from this interface to a worst case value that is no greater than the voltage of the 9.5V .S. power supply that is already in the system. Thus, the voltage on the allowable entity capacitance is not any greater than the voltage supplied by the power supply itself, and the current that is potentially added through R1 is negligible to any inductance that is present. Other configurations of a system are possible and within the scope of the invention.

The "buffered SCL Output" transistor can be a bipolar or FET transistor. In either case, the drive circuit for the transistor contains slew rate limiting so that the rising and falling edges of the "low" condition have a lower slew rate, thus improving the bus acceptability and certifiability in an EMC/RFI/EMI environment.

It is important to note that the present invention is not limited to the exemplary embodiments described herein. Modifications and substitutions by one of ordinary skill in the art are considered to be within the scope of the present invention.

Figure 11:
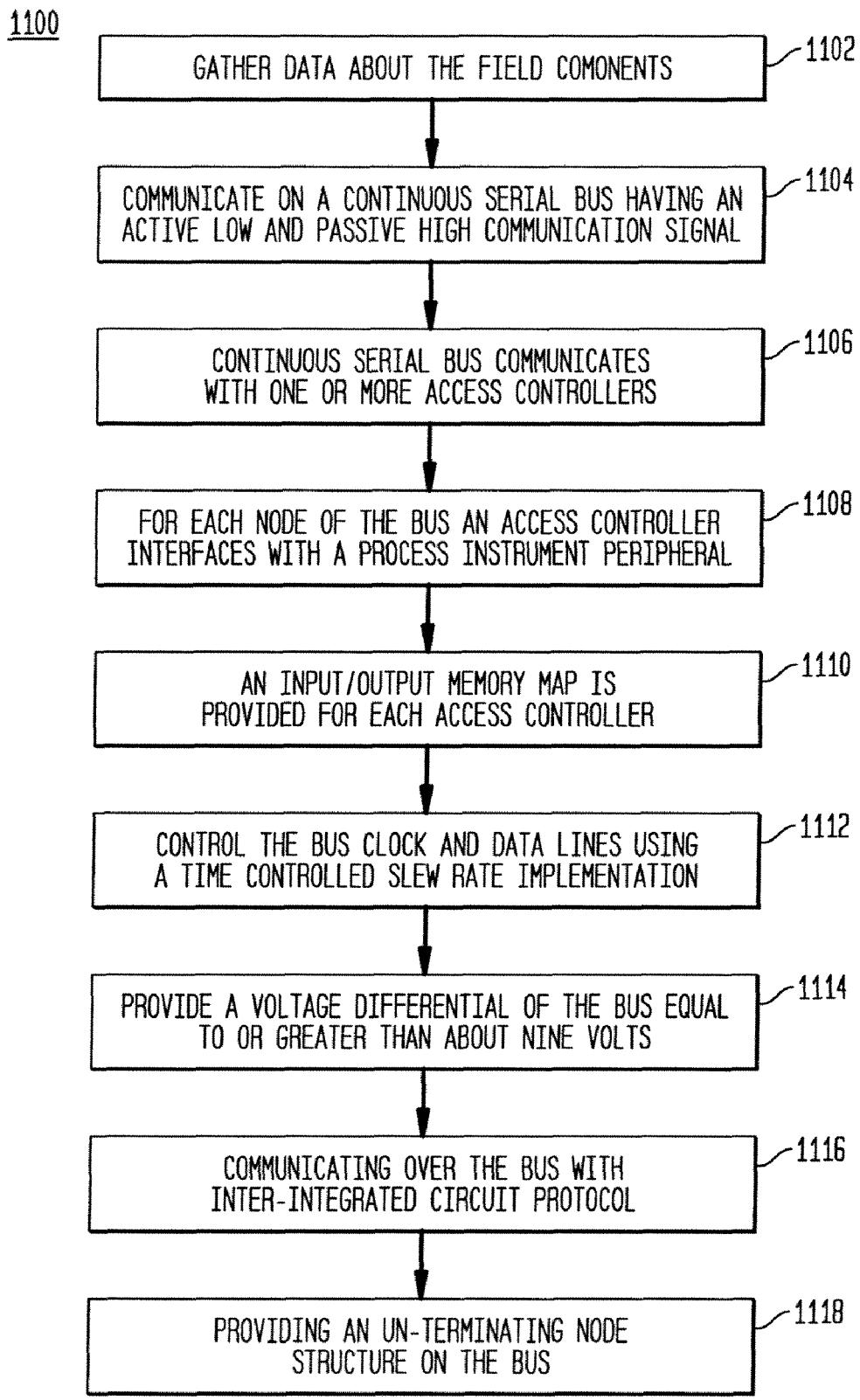
FIG. 11 is a flowchart of an exemplary method for an intrinsically safe bus according to the present invention.

Referring to FIG. 11, an exemplary method for providing an intrinsically safe bus comprises the controller/data gathering data about the field components (block 1102). Additionally the method comprises the act of communicating on a continuous serial bus having an active low and passive high communication signal (block 1104). The continuous serial bus may communicate with one or more access controllers (block 1106). The exemplary method provides that for each node of the bus an access controller interfaces with a process instrument peripheral (block 1108). The manufacturer of each peripheral or component in the sampling system may provide the interface electronics with each peripheral so that the access controller is able to communicate with the peripheral. The function or usage of each peripheral is pre-defined and configurable by internal EEPROM settings contained in the access controller. The exemplary method further provides an input/output memory map for each access controller (block 1110). The bus clock and data lines may be controlled using a time controlled slew rate implementation (block 1112). Further, the method may provide a voltage differential of the bus equal to or greater than about nine volts (block 1114). An exemplary method for providing an intrinsically safe bus comprises communicating over the bus with Inter-Integrated Circuit (I2C) protocol (block 1116). The method additionally comprises providing an un-terminating node structure on the bus (block 1118).

Additionally, the method for providing an intrinsically safe bus may involve an application in which the bus is used in a control sampling system to couple sampling controls and analyzers. Another exemplary application of the method may involve the access controller coupling the bus to one of a group comprising analog, digital, and serial protocol devices. The method for providing an intrinsically safe bus may result in communication at data rates above twenty kilobits.

Figure 12:
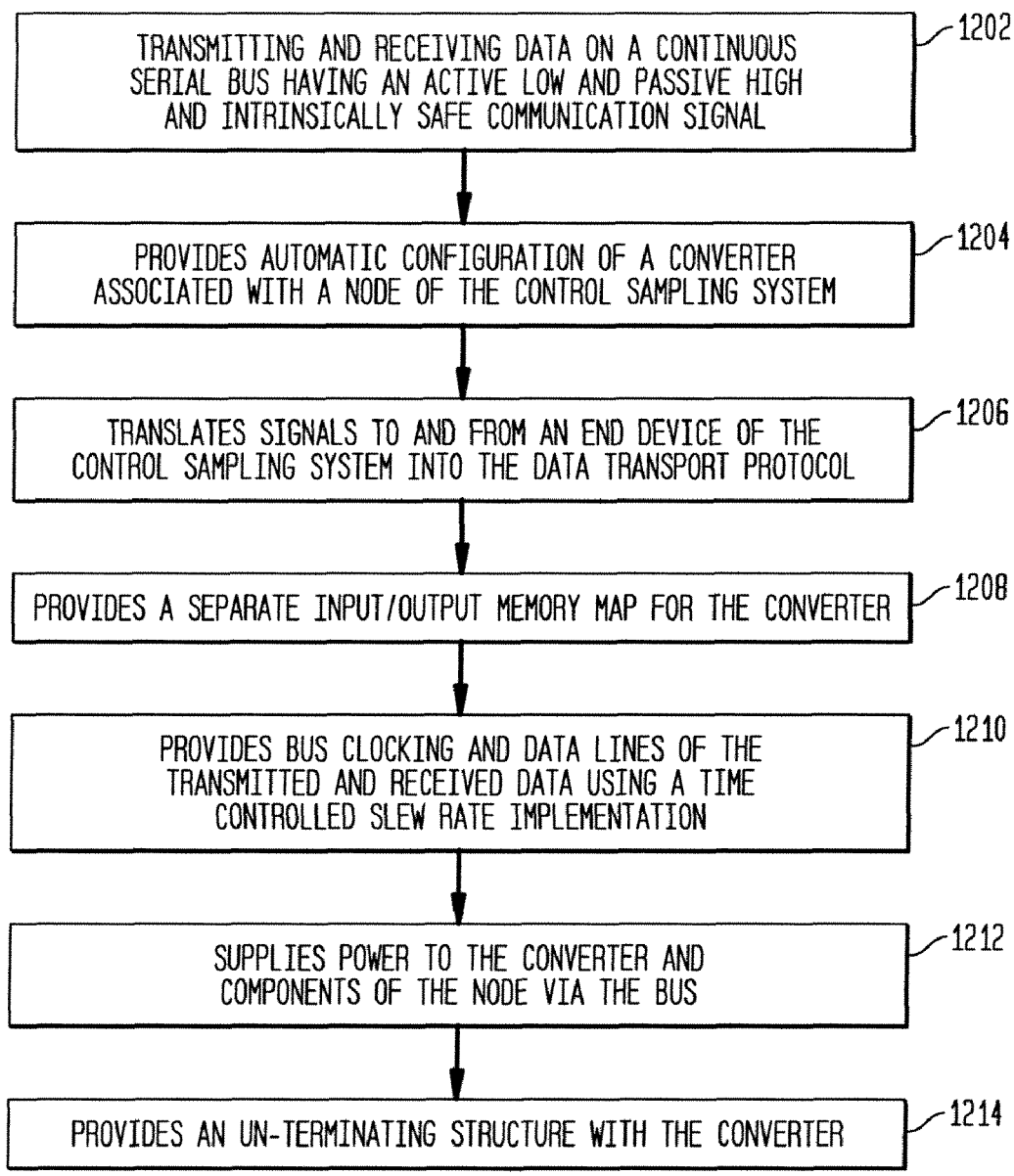
FIG. 12 is a flowchart of an exemplary data transport method according to the present invention.

Referring to FIG. 12, an exemplary data transport method is detailed in a flowchart. An exemplary method for an intrinsically safe control sampling system to couple sampling controls and analyzers initially transmits and receives data on a continuous serial bus having an active low and passive high signal which is additionally an intrinsically safe communication signal (block 1202). The data may be transmitted and received using Inter-Integrated Circuit (I2C) protocol. The method may provide automatic configuration of a converter associated with a node of the control sampling system (block 1204). Additionally, the method may involve translating signals to and from an end device of the control sampling system into the data transport protocol (block 1206). An exemplary method may also provide a separate input/output memory map for the converter. Additionally, the method comprises the act of providing bus clocking and data lines of the transmitted and received data using a time controlled slew rate implementation (block 1210). The method may also supply power to the converter and components of the node via the bus (block 1212). An exemplary data transport method comprises the act of providing an un-terminating structure with the converter (block 1214). An exemplary data transport method may also involve transmitting and receiving data from a programmable logic controller (PLC) or the control sampling system.

Figure 13:
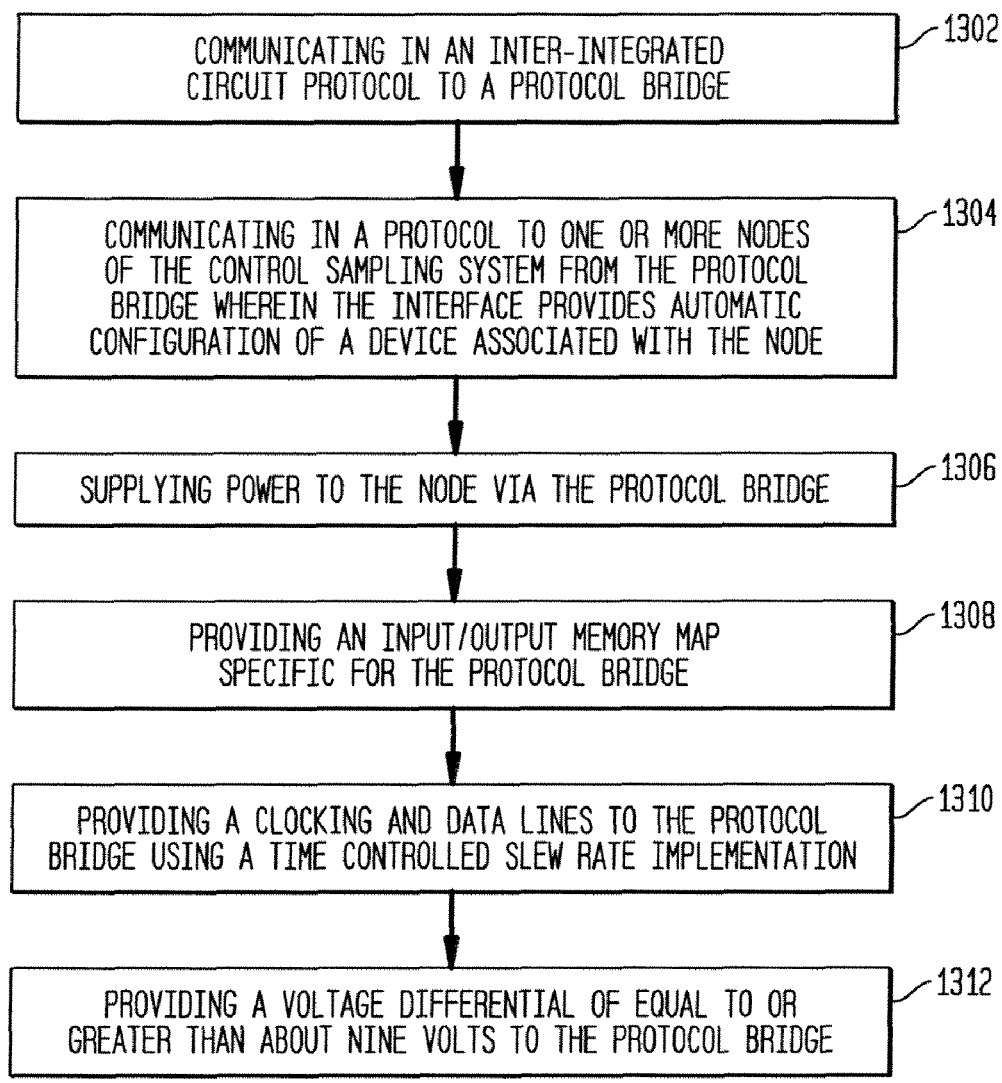
FIG. 13 is a flowchart of a method for providing a protocol bridge for an intrinsically safe control sampling system according to the present invention.

Referring to FIG. 13, an exemplary method of providing a protocol bridge for an intrinsically safe control sampling system to couple sampling controls and analyzers is detailed in a flowchart. An exemplary method may comprise the act of communicating in an Inter-Integrated Circuit (I2C) protocol to a access controller (block 1302). Additionally, the method may comprise the act of communicating in a protocol to one or more nodes of the control sampling system from the access controller wherein the interface provides automatic configuration of a device associated with the node (block 1304). An exemplary method may utilize an active low and passive high communication signal. The method may also comprise the act of supplying power to the node via the access controller (block 1306). An exemplary method of providing a protocol bridge may comprise providing an input/output memory map specific for the protocol bridge (block 1308). Additionally, the method may comprise the act of providing clocking and data lines to the protocol bridge using a time controlled slew rate implementation (block 1310). Furthermore, the method may comprise the action of providing a voltage differential of equal to or greater than about nine volts to the protocol bridge (block 1312). An exemplary method may also comprise communicating to one or more nodes that are in one of a group comprising analog, digital, and serial protocol devices.

The present invention is not intended to be limited to a system, device, or method which must satisfy one or more of any stated or implied object or feature of the invention and is not limited to the exemplary embodiments described herein. Modifications and substitutions by one of ordinary skill in the art are considered to be within the scope of the present invention.

The invention claimed is:

1. A bus architecture providing an intrinsically safe bus comprising:
   the bus being a continuous serial bus having an active low and passive high communication signal;
   a single end isolated power source;
   one or more access controllers to interface for each node of the bus;
   a transistor connected to one of the access controllers to drive the bus to an active low state; and
   a barrier connected between the transistor and the bus to limit voltage entering the bus due to power supplied to drive the transistor to a worst case value that is no greater than a voltage of the isolated power source.

2. The bus architecture of claim 1, wherein the bus is used in a control sampling system to couple sampling controls and analyzers.

3. The bus architecture of claim 1, further comprises:
separate input/output memory map for each access controller.

4. The bus architecture of claim 1, wherein clocking and data lines of the bus use a time controlled slew rate implementation.

5. The bus architecture of claim 1, wherein the bus achieves a voltage differential of equal or greater than about nine volts.

6. The bus architecture of claim 1, wherein the access controller couples the bus to one of a group comprising analog and serial protocol devices.

7. The bus architecture of claim 1, wherein the bus operates with Inter-Integrated Circuit protocol.

8. The bus architecture of claim 1, wherein the bus provides an un-terminating node structure.

9. The bus architecture of claim 1, wherein the bus communicates data at rates above twenty kilobits.

10. A method for providing an intrinsically safe bus comprising the acts of:
isolating a bus power source;
communicating on a continuous serial bus having an active low and passive high communication signal with one or more access controllers to interface for each node of the bus;
driving the bus to an active low state using a transistor connected to one of the access controllers; and
limiting voltage entering the bus due to power supplied to drive the transistor to a worst case value that is no greater than a voltage of the isolated power source by providing a barrier between the transistor and the bus.

11. The method of claim 10, wherein the bus is used in a control sampling system to couple sampling controls and analyzers.

12. The method of claim 10, further comprises the acts of:
providing an input/output memory map for each access controller.

13. The method of claim 10, further comprises the acts of:
controlling the dock and data lines of the bus using a time controlled slew rate implementation.

14. The method of claim 10, further comprises the acts of:
providing a voltage differential of the bus equal or greater than about nine volts.

15. The method of claim 10, wherein the access controller couples the bus to one of a group comprising analog and serial protocol devices.

16. The method of claim 10, further comprises the acts of:
communicating over the bus with Inter-Integrated Circuit protocol.

17. The method of claim 10, further comprises the acts of:
providing an un-terminating node structure on the bus.

18. The method of claim 10, wherein communicating is accomplished at data rates above twenty kilobits.

\* \* \* \* \*